United States Patent Office 3,053,173
Patented Sept. 11, 1962

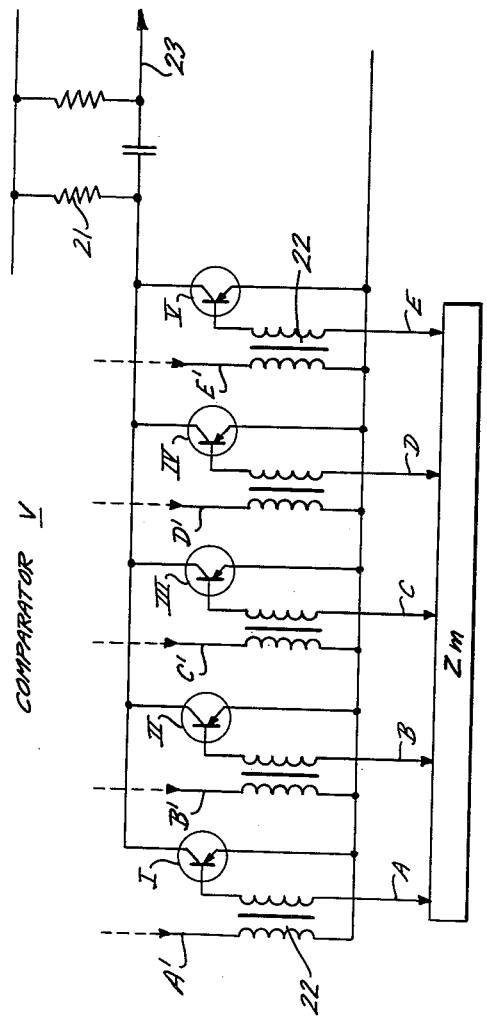

3,053,173
METHOD AND ARRANGEMENT FOR TRANSPOSING CODED DECIMAL VALUES FROM STORAGE TO VISUAL PRESENTATION IN DECIMAL NOTATION
Ernst Klevers, Villingen, Black Forest, Germany, assignor to Kienzle Apparate G.m.b.H., Villingen, Black Forest, Germany
Filed Apr. 6, 1961, Ser. No. 101,136
Claims priority, application Germany Apr. 7, 1960
15 Claims. (Cl. 101—93)

The present invention concerns electronic calculating or counting arrangements, and more specifically a method and an arrangement for transposing numerical values which are stored in an electronic storage, into visual presentation.

It is already known to derive printed information from electronic calculating or counting arrangements in which decimal values are stored, by providing the printing mechanism with means for furnishing, synchronously with the positioning of the digit printing types, ten read-out pulses and by applying these read-out pulses to the inputs of all the various order sections of the calculating arrangement whereby the information contained in all these sections is once circulated therethrough so that after the read-out operation the information stored in the individual order sections remains the same which existed therein before. In this system the transfers appearing at the individual order sections are not transmitted to the sections of respectively higher order position, but they are utilized for actuating arrestor magnets which stop the type positioning members in such a position that the digit type of the respective type wheel corresponds to the digit value stored in the respectively associated order section of the calculating arrangement. However, this known system is only applicable to electronic calculating arrangements which operate in terms of decimal values.

More recently electronic calculating arrangements are operated more and more on the basis of coded signal combinations, and under these circumstances the direct utilization of ten read-out pulses is not possible. Electronic calculating arrangements operating with coded information have, for each section associated with a particular order position of the decimal numbers to be processed, only a group of output lines the number of which corresponds to the number of code elements characteristic of the selected code. Different potentials appearing in certain combinations of these output lines represent a digit in coded form. In the case of multi-order decimal numbers usually a binary-decimal representation is used.

In such arrangements, wherever decimal values which are stored in coded form in an electronic storage, have been transposed into visual presentation, particularly in printed form, in decimal notation, this has been accomplished only by rather involved electro-mechanical arrangements involving the operation of great numbers of contacts changing between closed and opened positions. This has been found as being most inconvenient and not sufficiently reliable because mechanically operated contacts are subject to wear and to malfunctions due to this and other reasons.

It is therefore a main object of the present invention to provide for a method and arrangement for transposing decimal values which are stored in coded form in an electronic storage, into visual presentation in decimal notation, without however resorting to the use of a great number of mechanically operated contacts, but by purely electronic means.

It is a further object of this invention to provide for a system for the purpose set forth, based on comparatively simple and reliable components.

It is a further object of this invention to provide for a system of the type set forth which is adapted to be combined with practically any type of electronic calculating and counting arrangement.

With above objects in view, a method of transposing decimal values, which are stored in coded form in an electronic storage, into printed presentation in decimal notation, comprising the steps of: translating the read-out steps of a type printing device into corresponding coded signal combinations; transmitting coded signal combinations representing decimal values from the electronic storage, as well as the coded signal combinations derived from the steps of the type printing device to a comparison device for obtaining therefrom a stop pulse whenever the first mentioned signal combination is identical with the second mentioned signal combination, and applying such stop pulse to the type printing device so as to stop the latter in a position corresponding to the decimal value represented by that step of the printing device which caused transmission of a signal combination which tallies in the comparison device with the signal combination transmitted from the storage.

In another aspect of this invention, an arrangement is provided for transposing decimal values which are stored in coded form in an electronic storage, into visual presentation in decimal notation, comprising, in combination, digit indicating means for selectively indicating any one of a series of decimal digits and having indicator positioning members movable stepwise through a sequence of indicator positions respectively assigned to different decimal digits so as to be capable of indicating a selected decimal digit when said indicator positioning members are stopped in a correspondingly selected position; arrestor means for stopping said indicator positioning members in a selected position in response to a stop pulse; read-out pulse generator means operated by said digit indicating means for furnishing a sequence of read-out pulses in synchronism with the steps of the stepwise movement of said indicator positioning members and respectively associated with said sequence of positions; code translator means for translating the numerical significance of said indicator positions within said sequence thereof into corresponding coded signal combinations, said code translator means furnishing, in response to each of said sequence of read-out pulses furnished by said read-out pulse generator means, a different coded signal combination representing a decimal digit corresponding to the respective read-out pulse and thereby also to the corresponding indicator position of said digit indicating means; circuit means furnishing coded signal combinations available from an electronic storage and representing decimal values respectively; and comparison means for receiving from said circuit means decimal value information in the form of coded signal combinations, and for receiving from said translator means said coded signal combinations as result of a read-out operation, said comparison means furnishing a stop pulse to said arrestor means whenever a coded signal combination from said code translator means is identical with a coded signal combination from said circuit means, whereby in the course of the read-out operation coinciding with the stepwise movement of the digit indicating means through a sequence of decimal digit indicating positions, the digit indicating means will be stopped for indicating a digit when an indicating position has been reached which corresponds to a digit value that was stored in coded form in the storage.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 3 is a schematic circuit diagram illustrating a comparator arrangement forming part of the embodiment of FIG. 1.

Figure 1:
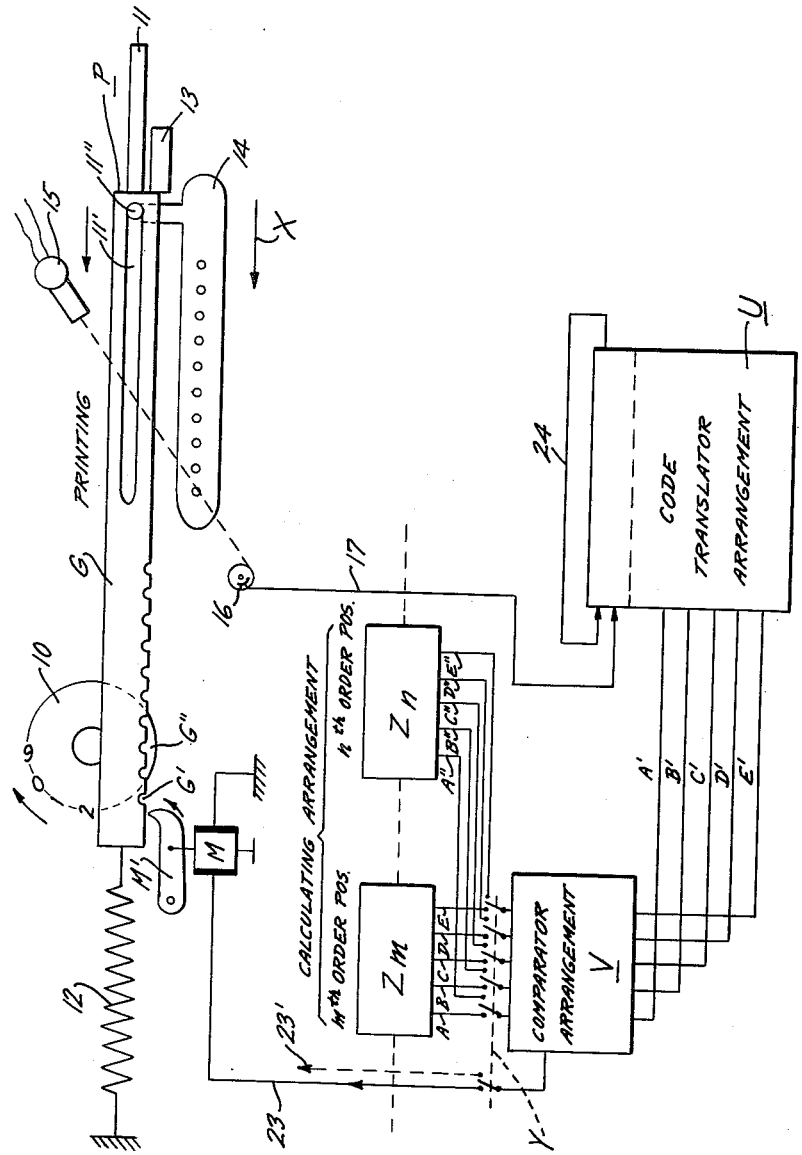
FIG. 1 is a schematic diagram illustrating the characteristic components of the arrangement according to the invention in connection with only those mechanical elements of a calculating machine which are required for the explanation of the invention.

Referring now to FIG. 1, the arrangement according to the invention mainly comprises: a type printing arrangement P serving as digit indicating device; a code translator arrangement U, and a comparator arrangement V.

It is to be understood that as a rule one set of the above named components is provided for each order position of the decimal numbers to be processed, and therefore each such set cooperates with one section of the calculating arrangement assigned to the particular order position. Therefore, the components P, U and V are illustrated in FIG. 1 primarily as cooperating with the section $Z_m$ of the calculating arrangement which section is assigned to the $m^{th}$ order position. Another section $Z_n$ assigned to the $n^{th}$ order position is illustrated only for describing further below a modification of the basic arrangement.

As far as the printing arrangement P is concerned, FIG. 1 illustrates only a type wheel 10 which, through gear means not shown, is adjustable to a variety of printing positions by means of a type positioning member or bar G.

The conventional operation of such a printing arrangement is as follows: All the type positioning bars G are held in the illustrated normal position i.e. abutting against a stationary stop bar 13, by means of a common cross bar 11 which engages a slot 11′ with a guide pin 11″, the bar G being biased by a spring 12 against the holding action of bar 11 and pin 11″. The cross bar 11 cooperates with all of the type positioning bars G and serves mainly the purpose of returning all the bars G after the completion of a printing operation to their normal position. When a printing operation is started, the motor not shown moves the common cross bar 11 in the direction of the arrow X. Under the action of the springs 12 all the type positioning bars G tend to follow the movement of the bar 11 until one of the bars G is stopped in a predetermined position which corresponds to a particular digit value which is to be read out. The read-out operation may be carried out, for instance, by using a stationary source of light 15 in cooperation with a perforated member 14 attached to the cross bar 11. The ray of light from the source 15 is directed at a photocell 16 but is obstructed by the member 14 unless during the movement of the latter together with the cross bar 11 the ten holes of the member 14 pass through the beam of light between the source 15 and the photocell 16. The spacing between the individual holes of the member 14 corresponds to the angular spacing of the digit types of the type wheel 10 so that every time when one of the digit types reaches printing position a pulse of light is applied to the photocell 16 which, in turn, furnishes a corresponding electrical impulse via line 17.

In connection with electronic calculating arrangements operating in terms of decimal values, the impulse from line 17 is used for causing, in the associated order section of the calculating arrangement, a counting backward one unit step from whatever numerical value was stored in that order section. Assuming for instance that in such order section of a calculating or counting arrangement the numerical value "3" was stored, the first pulse from the photocell will reduce this value to "2," the second pulse will reduce it to "1," and the third pulse will reduce the stored value to "0." The fourth pulse from the photocell 16 causes the stored value to move from the element "0" of the particular order section as a transfer back into the element "9" thereof. This transfer pulse is utilized for actuating an arrestor magnet M which causes the pertaining pawl M′ to engage one of the notches G′, G″ etc. of the type positioning member G so that the latter is now, in the present example after the fourth pulse from the photocell 16, stopped in a position in which the type wheel 10 has its type for the digit "3" in printing position. The cross bar 11 continues its movement in the direction of the arrow X so that the other type positioning bars G can be stopped in the required position in the same manner so that also the other type wheels 10 are correspondingly positioned for printing. When the cross bar 11 has reached the end of its stroke i.e. when all the bars G even one which has to position the associated type wheel 10 for printing "9" are positioned, the printing of the entire multi-order decimal number is carried out whereafter the cross bar 11 returns to its normal position and causes thereby all the type positioning bars G also to return to their normal positions so as to abut against the stationary stop bar 13.

The above described comparatively simple operation is not possible if numerical values are stored in the order sections of a storage of calculating arrangement in terms of a code. In the present case the sections $Z_n$, $Z_m$ etc. of a calculating arrangement are to be assumed to have stored therein numerical information in terms of a code which necessitates the provision of the code translator arrangement U and of the comparator arrangement V as illustrated and described herebelow.

Figure 2:
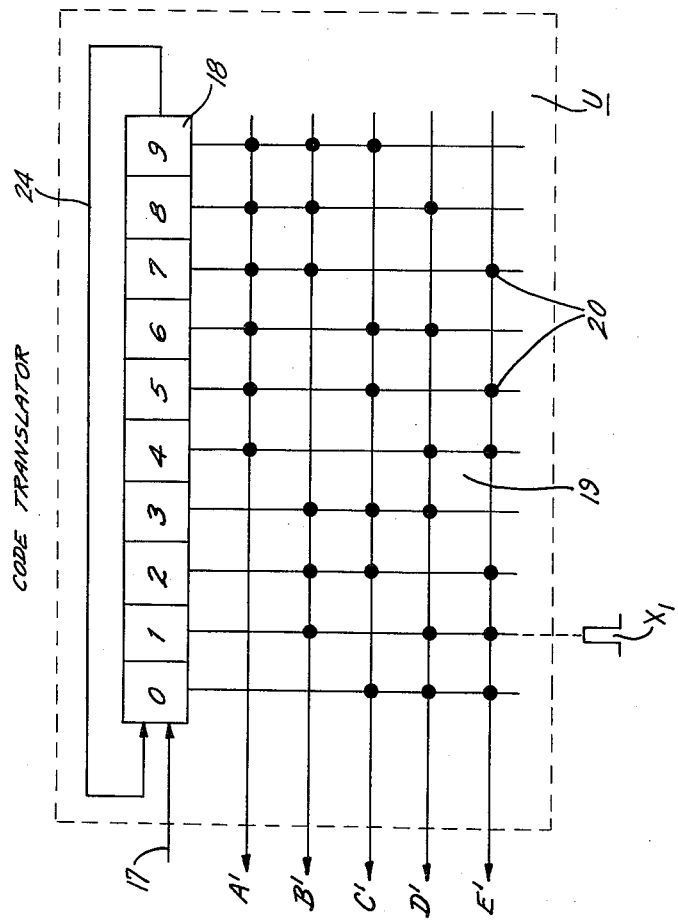
FIG. 2 is a schematic circuit diagram illustrating a code translator arrangement forming part of the embodiment of FIG. 1.

The code translator arrangement illustrated by way of example in FIG. 2 comprises a shift register 18 and a matrix 19. The shift register 18 is preferably constructed of ten magnet cores having substantially rectangular hysteresis characteristic as is well known. Normally, the first core 0 of the register is in a remanent condition of one magnetic polarity, while all the remaining cores 1 to 9 are in a remanent condition of opposite magnetic polarity. Each pulse from the photocell 16 applied through the line 17 as a read-out pulse shifts in well known manner any information stored in any one of the cores to the respectively next following core so that the tenth read-out pulse causes the information to leave the element 9 of the register 18 and to return through connection 24 to the core or element 0, one complete passage of information through the register 18 being terminated herewith. With every shift of information from one register element to the respectively following one a read-out pulse is delivered from the particular element to the respectively connected input line or column of the matrix 19. Assuming that the sections Z of the calculating arrangement are in the present example constructed to operate on the basis of a biquinary code, five output lines or rows A′, B′, C′, D′ and E′ are required in the matrix 19 as illustrated by FIG. 2.

For the purpose of explanation of the example, first the biquinary code referred to will be explained. It is a binary code with five code elements, two of which differ from the remaining ones.

5—Element Code (2+3 binary digits)

| Decimal Digit | Conductors | | | | |
|---|---|---|---|---|---|
| | A | B | C | D | E |
| 0 | 1 | 1 | 0 | 0 | 0 |
| 1 | 1 | 0 | 1 | 0 | 0 |
| 2 | 1 | 0 | 0 | 1 | 0 |
| 3 | 1 | 0 | 0 | 0 | 1 |
| 4 | 0 | 1 | 1 | 0 | 0 |
| 5 | 0 | 1 | 0 | 1 | 0 |
| 6 | 0 | 1 | 0 | 0 | 1 |
| 7 | 0 | 0 | 1 | 1 | 0 |
| 8 | 0 | 0 | 1 | 0 | 1 |
| 9 | 0 | 0 | 0 | 1 | 1 |

Again for the purpose of this example it should be understood that the symbol 0 represents the presence of a potential of e.g. −10 volts, while the symbol 1 represents the presence of a potential of e.g. +15 volts. The columns of above chart are marked A, B, C, D, E which corresponds to the output lines of the order section $Z_m$ and indicates which signal voltage combinations would be available when a digit value is stored in terms of this code in the section $Z_m$.

Since the individual register elements of the register 18 and the corresponding input lines or columns of the matrix 19 are respectively assigned to digit values ranging from 0 to 9, while the output lines A' to E' correspond to the code elements of coded signal combinations intended to represent the various decimal digit values, respectively, contact members 20, preferably diodes, are provided at those intersection points between rows and columns of the matrix which in each column predetermine the proper coded signal combination to be delivered by the unit U upon the introduction of the respective read-out pulse. For instance, in the column or input line emanating from the register element 0 the location of the contacts 20 in rows C', D' and E' corresponds to the symbol 0 in the code combination representing "0."

The output lines A' to E' of the translator arrangement U are taken, as shown by FIG. 1, to one set of inputs of the comparator arrangement V, while similarly the outputs A—E from the calculating section $Z_m$ are taken to a second set of inputs of the arrangement V. At this moment the optional multi-pole switch Y shown in FIG. 1 is to be disregarded.

The comparator arrangement is illustrated by way of example in greater detail by FIG. 3. In accordance with the above explained 5-element code the comparator arrangement V comprises five transistors I, II, III, IV and V, all being of the p-n-p type and all being connected with a common collector resistor 21. Each of the transistors is assigned to a different one of the five code elements of the code system, and in accordance therewith the individual transistors I to V are so connected with the respective output terminals of the associated calculating arrangement section $Z_m$ through corresponding conductors A, B, C, D, E that depending upon the distribution of "0" and "1" bits in a particular coded signal combination stored in $Z_m$ a partial group of the five transistors is in conductive condition while the remaining transistors are in non-conductive condition. This result is due to the fact that the conductors A—E coming from the respective order section $Z_m$ are connected with the respective bases of the transistors across a resistance of suitable value which may be constituted, as shown, by one winding of a respectively associated transformer 22. Those transistors to the bases of which negative potential is applied in this manner, are kept in conductive conduction. The other transistors to the bases of which positive potential is applied remain in non-conductive condition. For obvious reasons the distribution of positive and negative signals among the conductors A—E depends in each particular case upon the code system described above.

As can be seen from FIG. 3, the output lines A', B', C', D' and E' from the code translator arrangement are introduced into the comparator arrangement V in such a manner that each of these output lines is taken to the second winding of a different one of the transformers 22, respectively, so that any impulse delivered from the code translator arrangement U through any combination of the output lines A' to E' will act, through the intermediary of the respective transformer 22, on the bases of the corresponding transistors of the comparator arrangement V.

The following is an operational example of the transposition of a digit value stored in coded form in the order section $Z_m$ to the type wheel 10 of the respectively associated printing arrangement P. May it be assumed that in the order section $Z_m$ the decimal digit value "1" is stored in the coded form represented by the combination "1 0 1 0 0." In view of the above given definitions, under these circmumstances positive potential is applied through the conductors A and C to the bases of the transistors I and III whereby these two transistors are rendered non-conductive while the remaining transistors II, IV and V remain in conductive condition. In general terms, the particular code used in this example has $n=5$ code elements of which $n-m=2$ are positive signals, while $m=3$ are negative signals. Thus, $n-m=2$ transistors are now non-conductive while $m=3$ transistors are in conductive condition.

The first read-out pulse from the photocell 16 via line 17 shifts the information in the register 18 from the element 0 to the element 1. Simultaneously a positive pulse is delivered from the lateral output of the register element 0 into the pertaining column of the matrix 19 which is therefore delivered as an output pulse, due to the characteristic contact connections 20 in this particular column, to the output lines C', D' and E' and into the comparator arrangement V and through the respective transformers to the bases of the transistors III, IV and V. Now the transistors I and III to V are in non-conductive condition but transistor II remains in conductive condition. Consequently no change of potential appears in the collector output line 23.

The next following second read-out pulse from the photocell 16 shifts the information from the register element 1 into the element 2 while at the same time a read-out pulse $x_1$ is introduced from the element 1 into the pertaining input line or column of the matrix 19. On account of the shown interconnections 20 between this column and the output lines or rows B', D' and E' this positive pulse is transmitted through the just mentioned output lines to the comparator arrangement V and is accordingly applied through the corresponding second windings of the respective transformer 22 to the bases of the transistors II, IV and V. Now all the transistors I to V are in non-conductive condition because the positive pulses furnished by the shift register 18 and the matrix 19, and also the ratio between the primary and secondary windings of the transformers 22, are so chosen that any one of the positive pulses transmitted to any one of the transformers 22 is capable to overcompensate the negative potential which served to keep the respective transistor in conductive condition. As soon as all of the transistors I to V are in the same condition of conductivity, in this case in non-conductive condition, the potential previously existing in the collector output line 23 is subjected to a sudden change which has the characteristic of a pulse capable to act as a stop pulse for energizing the arrestor magnet M so as to actuate the pawl M' and thereby to stop the movement of the type positioning bar G, in this particular case by engaging the notch G''. The electromagnet M is to be understood to be equipped with a self-holding circuit, not shown but entirely known to the art so that after the application of the above-mentioned stop pulse through line 23 the pawl M' remains in locking engagement with the bar G. Consequently the type wheel 10 is now stopped in printing position for the digit type "1." Hereby the type positioning operation for one digit in one particular order position of the multi-order decimal number to be processed is completed. The actual printing operation is carried out automatically in conventional manner by the above mentioned drive motor and after the completion of the printing operation suitable means associated with the motor shaft, for instance a cam operated contact, may interrupt the holding circuit for the magnet M so that the magnet it deenergized, the pawl M' is released and disengaged from the bar G whereafter the mechanical members are returned, as described above by the cross-bar 11 to normal position. This applies not only to that set of the above described elements which are assigned to one particular order position of the multi-order decimal number but to all of the other similar sets of equipment related to the other order positions.

While in the above example only the transfer of a stored digit value "1" from storage to printing has been described, it is to be understood that the read-out operation takes place in exactly the same manner if values are to be transferred which correspond to the register elements 2, 3, 4 . . . 9. After reading-out the column connected with the register element 9 the information is shifted from the register element 9 through line 24 back to the register element 0 whereby the register and matrix is in condition ready for another transfer of values.

As can be seen from FIG. 2, in the matrix 19 predetermined contact connections 20 are provided at those intersection points which concern output lines from the matrix connected with transistors which in accordance with the particular code are kept in conductive condition by the potentials derived from the order section $Z_m$ of the calculating arrangement.

If the printing of digit values corresponding to stored values in different order sections of the electronic storage or calculating arrangement is to be carried out in parallel, then a separate comparison arrangement V and code translator arrangement U is required for dealing with the values in every different order position. However, if a printing arrangement is to be dealt with which is operated in serial sequence, then it is possible to use a modification of the above described arrangement which requires only one comparison arrangement V and only one code translator arrangement U. However, in this case a sequence of ten pulses must appear in the line 17 during the type positioning operation of each of the printing arrangements P assigned to the various order positions. Moreover, a multiple switch Y, as shown in FIG. 1, or a similarly operating commutator must be provided for alternatively, and sequentially, connecting the conductors A to E of the order section $Z_m$, the conductors A″ to E″ of the order section $Z_n$, etc. with the inputs of the comparator arrangement V, while at the same time the output of the comparator arrangement V is alternatively and sequentially connected by line 23 to the magnet M of one printing mechanism P, then through line 23′ to the corresponding magnet of the next following printing arrangement etc.

As can be seen, the transfer of coded decimal values from an electronic storage or calculating arrangement to a mechanical printing or similar device for presentation of the corresponding value in decimal notation is carried out by the above method and arrangement purely electronically which entails the advantages already mentioned above. However, a further advantage of the described system consists in the fact that any conventional printing apparatus which furnishes a sequence of ten read-out pulses suitable for controlling the transfer of values from storage to printing can be used, by interposition of the above described system, in cooperation with such electronic storage and calculating arrangements which operate in terms of coded signal combinations. Following the teaching of this invention it is possible to effect printing of decimal digit values under control of electronic calculating arrangements which operate on the basis of any one of the known decimal-binary codes. For instance, in addition to the above described biquinary code also codes based on the conventional code systems 1—2—2—4, 1—2—4—8, etc. are perfectly suitable. Since these last mentioned codes are 4-element codes, according to the invention only four conductors between the individual order section of the storage or calculating machine and the comparator arrangement, and only four output lines from the code translator or matrix to the other inputs of the comparator arrangement are necessary, and the comparator arrangement requires only four transistors.

This may be illustrated in the following example.

It may be assumed that the order section $Z_m$ according to FIG. 1 be constructed to operate on the basis of the following four-element binary code furnishing signals via only four conductors A, B, C, D.

4—Element Code  (1+2+2+4)

| Decimal Digit | Conductors | | | |
|---|---|---|---|---|
| | A | B | C | D |
| 0 | 0 | 0 | 0 | 0 |
| 1 | 1 | 0 | 0 | 0 |
| 2 | 0 | 1 | 0 | 0 |
| 3 | 1 | 1 | 0 | 0 |
| 4 | 0 | 1 | 1 | 0 |
| 5 | 1 | 1 | 1 | 0 |
| 6 | 0 | 0 | 1 | 1 |
| 7 | 1 | 0 | 1 | 1 |
| 8 | 0 | 1 | 1 | 1 |
| 9 | 1 | 1 | 1 | 1 |

In above system it may be assumed that the binary digit 0 is represented by a potential of e.g. −10 volts while the binary digit 1 is represented by a potential of +15 volts.

Of course, in this case the matrix 19 has only four output lines or rows for delivering signals via output lines A′ to D′ to the comparator arrangement V which in this case has only transistors I to IV.

In this case, in the matrix connecting contacts or the like 20 between columns and rows are provided at those intersection points which, in each column, correspond to the binary digit 0 of a code combination to be delivered through the lines A′ to D′. For instance, for the representation of the decimal digit "3" the output lines C′ and D′ are connected at the respective intersection points with the column which is connected with the register element 3 of register 18.

In this particular case the read-out operation must be carried out somewhat different from that which has been described above with respect to the biquinary code because in the case of the four-element code special conditions prevail with respect to the decimal digit values "0" and "9." For instance, for the decimal digit "0" the matrix 19 would deliver to all the four transistors I to IV positive pulses so as to render all of them non-conductive. Consequently, the reading-out of the value "0" must not be carried out at the beginning of the read-out and transfer operation because otherwise right at the beginning all the type positioning bars G would be stopped in the type printing position for the digit "0." Therefore the sequence of the read-out operation is to be the following: 8 7 6 5 4 3 2 1 0.

On the other hand, the code shows that in the case of the digit value "9" all the transistors I to IV would be rendered through the conductor from the order section $Z_m$ non-conductive before the read-out operation is started. Consequently, during the read-out operation and type positioning movement required for the digit value "9" no sudden change of potential in the collector output line 23 could ever occur. In this manner the respective stop magnet M would not be energized to stop the forward moving type positioning bar G. However, this difficulty can be solved easily by arranging the printing type "9" on the type wheel 10 of the printing apparatus in such a manner that it will be in printing position when no stop pulse is required for the corresponding positioning of the type mechanism. For this purpose the arrangement is such that the type "9" is in printing position as the last one of the series of digit types when the respective type positioning bar G has completed its full stroke. Therefore the read-out operation and transfer of digit signals is the following: 8 7 6 5 4 3 2 1 0 9. Although for this purpose the type wheel 10 must be engraved in a matter slightly differing from the conventional one it will be understood that this does not constitute any serious difficulty.

It should be further understood that the transfer of coded values from an electronic calculating, storage or counting arrangement to a printing mechanism for presentation in decimal notation can be carried out by the system according to the invention even if the normal mode of operation of one or the other of the above mentioned arrangements differs from the operation described above for the illustrated embodiments. For instance, electronic calculating arrangements are known in which numerical values can be switched, shifted or counted in only one direction. In such calculating arrangements the ten read-out pulses furnished from the printing apparatus cause the respective order section to count in the regular direction and the pulse which is available at the transition of a particular order section from a stored value "9" to a stored value "0" stops the respective type positioning member G by actuation of the corresponding stop magnet M. In this case the type wheels 10 are engraved so as to carry the digit types in a complementary manner.

On the other hand, if only a printing arrangement is available in which the type wheels are engraved in the manner illustrated by FIG. 1, then the calculating operations in the electronic calculating arrangement must be carried out with complementary values. Since in this case the calculating results are always available in the electronic calculating arrangement in complementary fashion, the forward counting read-out pulses can be applied directly to the printing arrangement.

Since it is one object of this invention to avoid the use of mechanically operated contacts for closing and opening circuits, it should be noted that even the above mentioned self-holding circuit of the magnet device M does not have to be equipped with contact pairs that are to be opened and closed. Instead of holding the pawl M' in engaged position by keeping the magnet M energized through a holding circuit, the same effect can be obtained by purely mechanically locking the pawl in engaged position. Such automatic locking means of mechanical nature are entirely known. In this manner the respective pawl would be held in engaged locking position until the cross bar 11 mechanically releases the pawls of all the type positioning bars G and returns all these bars to their normal positions as illustrated in FIG. 1.

It will be understood that each of the elements described above, or two or more together, may also find a useful application in other types of a method and arrangement for transposing coded decimal values from storage into visual presentation in decimal notation differing from the types described above.

While the invention has been illustrated and described as embodied in a method and arrangement for transposing decimal values which are stored in coded form in an electronic storage, into printed presentation in decimal notation, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A method of transposing decimal values, which are stored in coded form in an electronic storage, into printed presentation in decimal notation, comprising the steps of: causing a type printing device to carry out read-out steps between printing positions respectively representing different decimal values; translating said read-out steps into corresponding coded signal combinations; transmitting coded signal combinations representing decimal values from the electronic storage, as well as the coded signal combinations derived from the steps of the type printing device to a comparison device for obtaining therefrom a stop pulse whenever the first mentioned signal combination is identical with the second mentioned signal combination, said stop pulse benig adapted to stop said type printing device when applied thereto; and applying such stop pulse to the type printing device so as to stop the latter in a position corresponding to the decimal value represented by that step of the printing device which caused transmission of a signal combination which tallies in the comparison device with the signal combination transmitted from the storage.

2. An arrangement for transposing decimal values which are stored in coded form in an electronic storage, into visual presentation in decimal notation, comprising, in combination, digit indicating means for selectively indicating any one of a series of decimal digits and having indicator positioning members movable stepwise through a sequence of indicator positions respectively assigned to different decimal digits so as to be capable of indicating a selected decimal digit when said indicator positioning members are stopped in a correspondingly selected position; arrestor means for stopping said indicator positioning members in a selected position in response to a stop pulse; read-out pulse generator means operated by said digit indicating means for furnishing a sequence of read-out pulses in synchronism with the steps of the stepwise movement of said indicator positioning members and respectively associated with said sequence of positions; code translator means for translating the numerical significance of said indicator positions within said sequence thereof into corresponding coded signal combinations, said code translator means furnishing, in response to each of said sequence of read-out pulses furnished by said read-out pulse generator means, a different coded signal combination representing a decimal digit corresponding to the respective read-out pulse and thereby also to the corresponding indicator position of said digit indicating means; circuit means furnishing coded signal combinations available from an electronic storage and representing decimal values, respectively; and comparison means for receiving from said circuit means decimal value information in the form of coded signal combinations, and for receiving from said translator means said coded signal combinations as result of a read-out operation, said comparison means furnishing a stop pulse to said arrestor means whenever a coded signal combination from said code translator means is identical with a coded signal combination from said circuit means, whereby in the course of the read-out operation coinciding with the stepwise movement of the digit indicating means through a sequence of decimal digit indicating positions, the digit indicating means will be stopped for indicating a digit when an indicating position has been reached which corresponds to a digit value that was stored in coded form in the storage.

3. An arrangement for transposing decimal values which are stored in coded form in an electronic storage, into printed presentation in decimal notation, comprising, in combination, type printing means for selectively printing any one of a series of decimal digits and having type positioning members movable stepwise through a sequence of type positions respectively assigned to different decimal digits so as to be capable of printing a selected decimal digit when said type positioning members are stopped in a correspondingly selected position; arrestor means for stopping said type positioning members in a selected position in response to a stop pulse; read-out pulse generator means operated by said type printing means for furnishing a sequence of read-out pulses in synchronism with the steps of the stepwise movement of said type positioning members and respectively associated with said sequence of positions; code translator means for translating the numerical significance of said type positions within said sequence thereof into corresponding coded signal combinations, said code translator means furnishing, in response to each of said sequence of read-out pulses furnished by said read-out pulse generator means, a different coded signal combination representing a decimal digit corresponding to the respective read-out pulse and thereby also to the corresponding type position of said type printing means; circuit means furnishing coded signal combinations available from an electronic storage and representing decimal values, respectively; and comparison means for receiving from said circuit means decimal value information in the form of coded signal combinations, and for receiving from said translator means said coded signal combinations as result of a read-out operation, said comparison means furnishing a stop pulse to said arrestor means whenever a coded signal combination from said code translator means is identical with a coded signal combination from said circuit means, whereby in the course of the read-out operation coinciding with the stepwise movement of the type printing means through a sequence of decimal digit printing positions, the type printing means will be stopped for printing a digit when a printing position has been reached which corresponds to a digit value that was stored in coded form in the storage.

4. An arrangement for transposing decimal values which are stored in coded form in an electronic storage, into printed presentation in decimal notation, comprising, in combination, type printing means for selectively printing any one of a series of decimal digits and having type positioning members movable stepwise through a sequence of type positions respectively assigned to different decimal digits so as to be capable of printing a selected decimal digit when said type positioning members are stopped in a correspondingly selected position; arrestor means for stopping said type positioning members in a selected position in response to a stop pulse; read-out pulse generator means operated by said type printing means for furnishing a sequence of read-out pulses in synchronism with the steps of the stepwise movement of said type positioning members and respectively associated with said sequence of positions; code translator means for translating the numerical significance of said type positions within said sequence thereof into corresponding coded signal combinations of $n$ code-elements each and having $n$ outputs, said code translator means furnishing, in response to each of said sequence of read-out pulses furnished by said read-out pulse generator means, at said outputs a different coded signal combination of $n$ code-elements representing a decimal digit corresponding to the respective read-out pulse and thereby also to the corresponding type position of said type printing means; circuit means including $n$ conductors furnishing coded signal combinations of $n$ code-elements available from an electronic storage and representing decimal values, respectively; and comparison means having $n$ first inputs for receiving from said circuit means decimal value information in the form of coded signal combinations of $n$ code-elements, and having $n$ second inputs for receiving from said outputs of said translator means said coded signal combinations of $n$ code-elements as result of a read-out operation, said comparison means furnishing a stop pulse to said arrestor means whenever a coded signal combination from said code translator means is identical with a coded signal combination from said circuit means, whereby in the course of the read-out operation coinciding with the stepwise movement of the type printing means through a sequence of decimal digit printing positions, the type printing means will be stopped for printing a digit when a printing position has been reached which corresponds to a digit value that was stored in coded form in the storage.

5. An arrangement as claimed in claim 4, wherein said electronic storage is composed of sections respectively assigned to different order positions of a decimal number, and wherein each section of the storage is cooperatively associated, respectively, with a different set of said type printing, arrestor, read-out, code translator, circuit and comparison means.

6. An arrangement as claimed in claim 4, wherein said code translator means comprise a matrix type arrangement having a plurality of input lines in parallel array assigned respectively to decimal digits ranging between 0 and 9 and adapted to receive in their consecutive order said read-out pulses, and a plurality of $n$ output lines connected respectively with said $n$ outputs and arranged in parallel array and intersecting all said input lines, with connector means arranged between input lines and output lines at those intersections thereof which in the individual input lines determine the delivery to said outputs of a coded signal combination representing the decimal digit to which the particular input is assigned.

7. An arrangement as claimed in claim 6, including stepping switch means arranged between said read-out pulse generator means and said input lines of said matrix type arrangement for transmitting consecutive read-out pulses to said input lines in their consecutive order.

8. An arrangement as claimed in claim 7, wherein said stepping switch means is a magnetic shift register comprising a chain of magnetic cores having substantially rectangular hysteresis characteristic.

9. An arrangement as claimed in claim 4, wherein said comparison means comprise a plurality of $n$ transistor means respectively assigned to said $n$ code-elements, each of said $n$ conductors of said circuit means being connected to the base of a different one of said transistor means for rendering a combination of $n-m$ of said $n$ transistor means non-conductive while leaving $m$ thereof conductive, the combination $(n-m)/m$ corresponding to a coded signal combination furnished through said conductors from the electronic storage, and said $n$ outputs of said code translator means being so connected with said $n$ transistor means that upon receiving from said translator means a coded signal combination identical with said coded signal combination furnished from the storage, all said $n$ transistor means are caused to assume the same condition of conductivity, said $n$ transistor means being connected to said arrestor means for furnishing thereto a stop pulse when all of said transistor means assume the same condition of conductivity.

10. An arrangement as claimed in claim 6, wherein said comparison means comprise a plurality of $n$ transistor means respectively assigned to said $n$ code-elements, each of said $n$ conductors of said circuit means being connected to the base of a different one of said transistor means for rendering a combination of $n-m$ of said $n$ transistor means non-conductive while leaving $m$ thereof conductive, the combination $(n-m)/m$ corresponding to a coded signal combination furnished through said conductors from the electronic storage, and said $n$ outputs of said code translator means being so connected with said $n$ transistor means that upon receiving from said translator means a coded signal combination identical with said coded signal combination furnished from the storage, all said $n$ transistor means are caused to assume the same condition of conductivity, said $n$ transistor means being connected to said arrestor means for furnishing thereto a stop pulse when all of said transistor means assume the same condition of conductivity.

11. An arrangement as claimed in claim 10, including stepping switch means arranged between said read-out pulse generator means and said input lines of said matrix type arrangement for transmitting consecutive read-out pulses to said input lines in their consecutive order.

12. An arrangement as claimed in claim 11, wherein said stepping switch means is a magnetic shift register comprising a chain of magnetic cores having substantially rectangular hysteresis characteristic.

13. An arrangement as claimed in claim 12, wherein said electronic storage is composed of sections respectively assigned to different order positions of a decimal number, and wherein each section of the storage is cooperatively associated, respectively, with a different set of said type printing, arrestor, read-out, code translator, circuit and comparison means.

14. An arrangement as claimed in claim 4, wherein said electronic storage is composed of a plurality of sections respectively assigned to different order positions of a decimal number, and wherein each section of the storage is cooperatively associated with a different set of said type printing and arrestor means, while only one code translator and comparison means is provided for cooperation therewith, said circuit means including a plurality of groups of $n$ conductors each assigned to said plurality of sections, respectively, and multi-pole switch means for alternatively connecting any one of said groups of conductors with said first inputs of said comparison means, and for simultaneously therewith connecting said comparison means with a corresponding one of said arrestor means for applying said stop pulse to that one thereof which is associated with the same storage section as said one of said groups of conductors.

15. An arrangement for transposing decimal values which are stored in coded form in an electronic storage, into visual presentation in decimal notation, comprising, in combination, digit indicator means for selectively indicating any one of a series of decimal digits; positioning means movable stepwise through a sequence of positions respectively representing said decimal digits, for moving said digit indicator means into an indicating position corresponding to a selected decimal digit when stopped in such position in response to a stop pulse; first transmitter means for furnishing first coded signal combinations representing decimal values stored in the electronic storage; second transmitter means for furnishing second coded signal combinations representing respectively different positions of said positioning means and thus respectively different decimal digits; comparison means connected with said first and second transmitter means for receiving and comparing said first and second signal combinations and for furnishing said stop pulse whenever one of said first signal combinations is identical with one of said second signal combinations; and means for arresting said positioning means, upon application of one of said stop pulses thereto, in a position corresponding to that one of said decimal digits which is represented by the second signal combination which by being identical with a particular one of said first signal combinations has caused said stop pulse.

References Cited in the file of this patent
UNITED STATES PATENTS

| | | |
|---|---|---|
| 2,692,551 | Potter | Oct. 26, 1954 |
| 2,776,618 | Hantley | Jan. 8, 1957 |
| 2,799,222 | Goldberg | July 16, 1957 |
| 2,873,666 | Stiefel | Feb. 17, 1959 |
| 2,939,388 | Froggatt | June 7, 1960 |